Figure 1:
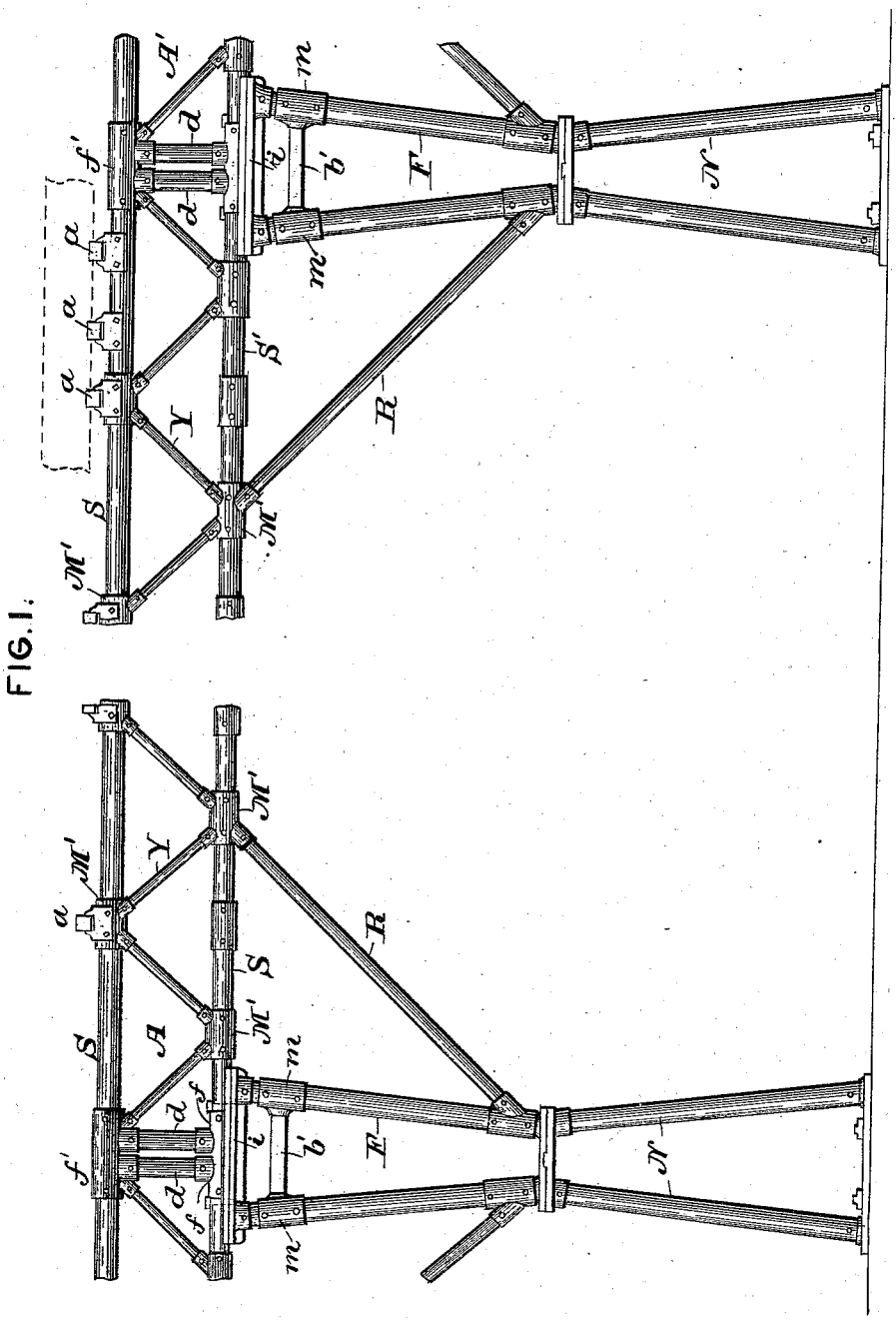

(No Model.) 4 Sheets—Sheet 2.

Z. P. BOYER.
ELEVATED CABLE MOTOR OR OTHER RAILWAY STRUCTURE.

No. 382,407. Patented May 8, 1888.

ATTEST.
J. Henry Kaiser
Victor J. Evans

INVENTOR.
Zaccur Prall Boyer.
By his Attorney.
Geo. M. Roads.

(No Model.) 4 Sheets—Sheet 3.
Z. P. BOYER.
ELEVATED CABLE MOTOR OR OTHER RAILWAY STRUCTURE.
No. 382,407. Patented May 8, 1888.
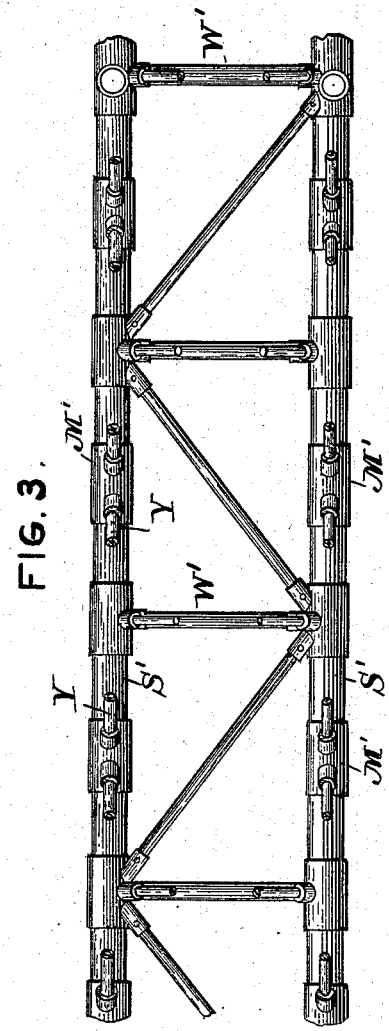
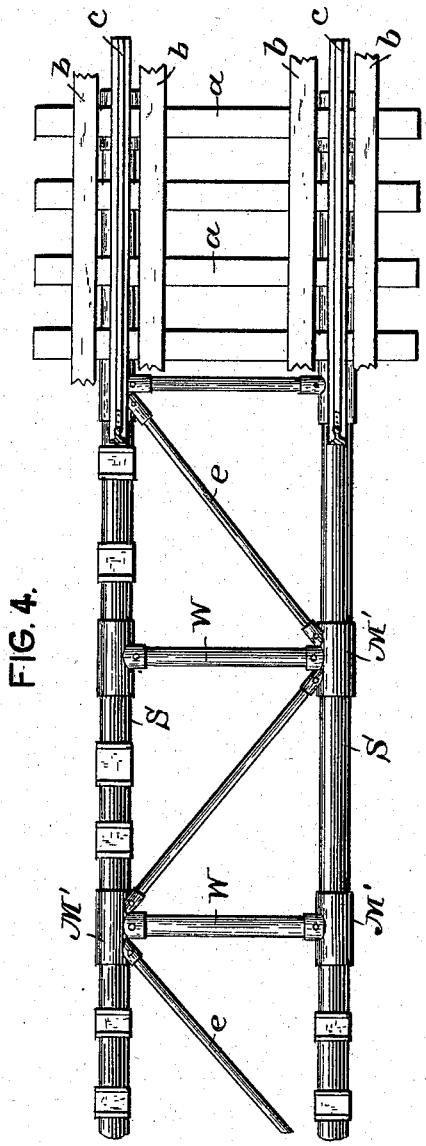
ATTEST.
J. Henry Kaiser
Victor J. Evans.
INVENTOR.
Zaccur Pratt Boyer.
By his Attorney.
Geo. M. Roads.

(No Model.)  4 Sheets—Sheet 4.

Z. P. BOYER.
ELEVATED CABLE MOTOR OR OTHER RAILWAY STRUCTURE.

No. 382,407. Patented May 8, 1888.

ATTEST.
J. Henry Kaiser
Victor J. Evans.

INVENTOR.
Zaccur Pratt Boyer.
By his Attorney,
Geo. M. Roads.

UNITED STATES PATENT OFFICE.

ZACCUR PRALL BOYER, OF PHILADELPHIA, PENNSYLVANIA.

ELEVATED CABLE-MOTOR OR OTHER RAILWAY STRUCTURE.

SPECIFICATION forming part of Letters Patent No. 382,407, dated May 8, 1888.

Application filed August 13, 1887. Serial No. 246,901. (No model.)

*To all whom it may concern:*

Be it known that I, ZACCUR PRALL BOYER, a citizen of the United States, residing in the city and county of Philadelphia, Pennsylvania, have invented a new and useful Improvement in Elevated Cable-Motor or other Railway Structures, of which the following is a specification.

My object is to provide a structure for elevated cable-motor or other railways, which will be more economical, less liable to oscillation and vibration, occupy less of the street, thereby obstructing the smallest possible amount of light and air from the adjoining houses, entirely avoiding, when the construction is intended for a cable-motor railway, all of the many nuisances attendant upon the running of a locomotive on or over a city street—such as smoke, danger from fire, dust, and ashes—and by simple devices render the movement of the cars over the track practically noiseless. I accomplish these desirable objects by means of a structure composed principally of spans of four chords each, with their proper braces, struts and ties, and supporting-columns all made of metal tubing, the various parts of the spans, as well as the spans themselves, being connected by means of sleeves of like material and bolted or otherwise securely fastened, and by use of cushions under the sills or cross-ties, and by the use of plugged track-rails.

Referring to the drawings accompanying this application, similar letters indicate corresponding parts in the several figures.

Figure 2:
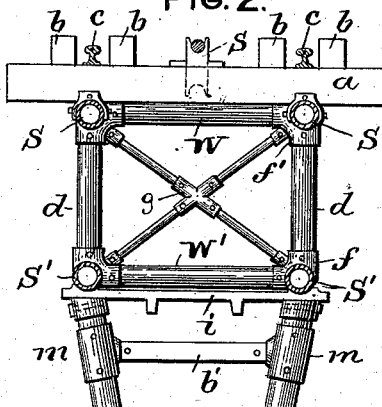
Figure 5:
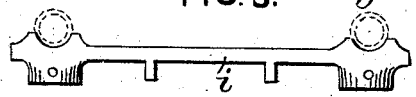
Figure 6:
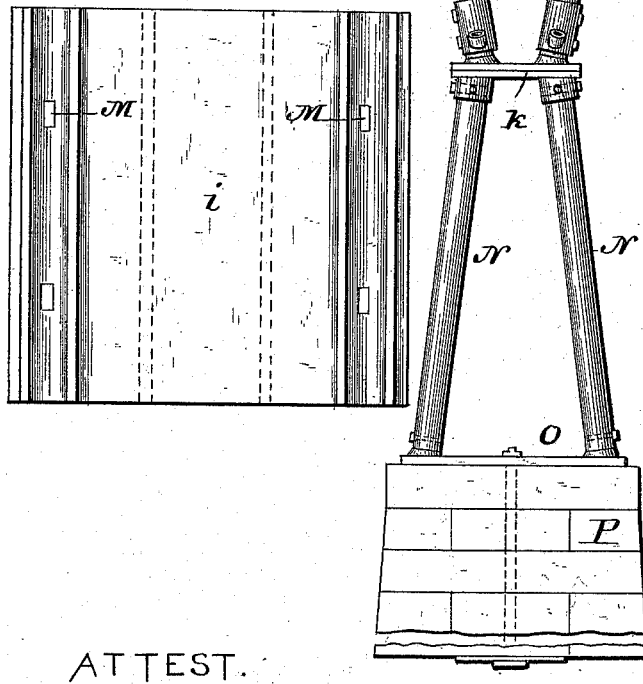
Figure 7:
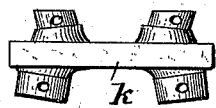
Figure 8:
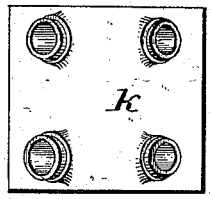
Figure 9:
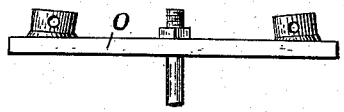
Figure 10:
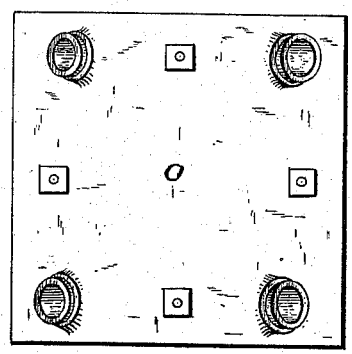
Figure 11:
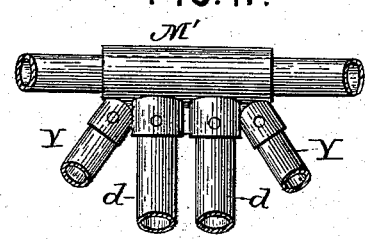
Figure 12:
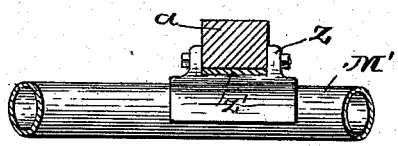
Figure 13:
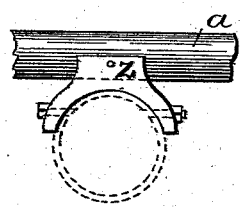
Figure 14:
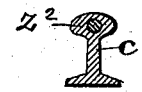

Figure 1 is a side elevation of my elevated cable-motor or other railway structure, showing spans, trusses, braces, plates, supporting-columns, and foundations, also showing a portion of the structure with cross-ties, guard-rails, and track-rails complete. Fig. 2 is an end view of my structure, showing cross-ties, guard-rails, and track-rails, with the cable and friction-pulley S in position. Fig. 3 is a plan view of the lower horizontal system of structure. Fig. 4 is a plan view of the upper horizontal system of structure. Fig. 5 is a vertical cross-section of the upper bed-plates, $i\ i$, with lugs, webs, and seats for the lower chords of the span. Fig. 6 is a plan view of the upper bed-plates, $i\ i$, showing lugs and oblong bolt-holes. Fig. 7 is a front or side elevation of the middle bed-plates, $k\ k$, showing lugs on both sides. Fig. 8 is a plan view of said middle bed-plates, indicating lugs. Fig. 9 is a front or side elevation of the lower bed-plates, O, with lugs and bolt-holes and foundation-bolt. Fig. 10 is a plan view of the same, showing foundation bolts and lugs. Fig. 11 is a side elevation of the ends of adjoining spans, showing the manner of connection of the chords of one span with those of another. Fig. 12 is a side elevation of a sleeve with chairs Z Z upon said sleeves, and the sill or cross-tie $a$ with the cushion Z'. Fig. 13 is an end view of the chair Z with side elevation of sill $a$. Fig. 14 is an end view of a rail having at each end a drill-hole or aperture filled with lead.

A A in Fig. 1 represent several spans of my elevated cable-motor or other railway structure.

S S and S' S' are the upper and lower chords, made of wrought-iron, steel, or other suitable metal tubing, extending the entire length of the spans. These chords are four in number. The upper chords are connected to each other by the upper horizontal transverse struts, W W, and the upper cross-struts, $e\ e$, and to the lower chords by the end posts, $d\ d$, and by the transverse side braces, Y Y. The lower chords are connected to each other by the lower horizontal transverse struts, W' W', and to the upper chords, as stated. The two upper chords, with their lateral struts and cross-ties, constitute the upper horizontal system. The two lower chords, with their horizontal struts and cross-ties, constitute the lower horizontal system, the two systems constituting one span. The several spans are connected by means of sleeves which are fastened to the chords by bolts, the chords of one span being connected to the corresponding chords of the next span by means of the end connecting-blocks, as shown in Fig. 11. The sleeves and blocks are provided with oblong bolt-holes to allow for the expansion and contraction of the metal in the spans. The ends of each span rest upon and extend to the center of the upper bed-plates, $i\ i$, and are securely fastened thereto by means of the end connecting-blocks, $f\ f\ f\ f$, which are bolted to the bed-plates $i\ i$.

$a\ a$, in Figs. 1 and 2, are the ordinary wooden railway cross-ties.

$b\ b$ are the guard-rails.

$c\ c$ are the track-rails.

$Z^2 Z^2$, in Fig. 14, are the lead-holes in the track-rails.

$d\ d$ are end posts or struts connecting the ends of the upper and lower chords, and are secured in the end connecting-blocks, $f\ f\ f\ f$, into which the ends of the chords are inserted.

Y Y are cross-struts, and are connected to the ends of the upper and lower chords by means of end connecting-blocks, $f'\ f'\ f'\ f'$, to which they are secured. Cross-struts W W W' W' connect the chords at intervals along their entire length by means of sleeves, lugs, and bolts, as can be readily seen by the drawings.

$f\ f\ f'\ f'$ are connecting-blocks to connect the chords, posts, and the transverse trusses, all of said parts being fastened by bolts or other means to said blocks, which rest in seats, and $f f$ are bolted to the bed-plates $i\ i\ i$ at the ends of the spans.

$g\ g$ are the central connecting-blocks, in form as shown in Fig. 2, and connect the transverse tie-rods at the ends of each span.

$i\ i$ are the upper bed-plates, made of wrought-iron, steel, or other metal tubing, having lugs on the lower side and seats to accommodate the end connecting-blocks, $f\ f$, to the plates. Through oblong bolt-holes, to allow for the expansion and contraction of the spans, are secured the end connecting-blocks, $f f$. Thus each span of the structure is made to rest upon and extend to the center of plates $i\ i$. The plates $i\ i$ are supported by wrought-iron, steel, or other metal tubing columns, connections being made by means of lugs on the lower side of said plates, and are securely fastened to the plates by bolts or other metal devices. Ribs on the lower side of the plates tend to strengthen them.

Attention is called to the fact that the drawings accompanying this application are supposed to show the upper and lower bed-plates supported by four similar columns; but I may use a greater or less number of columns, as occasion or necessity may require.

The columns F F are of such length and are so set or placed in position that, secured to the upper bed-plates, as described, they have an inward bearing upon the middle bed-plate, $k$, to which they are fastened also by means of lugs and bolts upon the upper side of said plate, thus preventing any oscillation or vibration of the structure and also avoiding the necessity of a double structure for an elevated railroad, greatly reducing the cost of such roads and avoiding the occupancy of both sides of the street over which the structure is built.

$k\ k$ are the middle plates, also made of wrought-iron, steel, iron or other metal, and are shown in Fig. 2 of the drawings as made in two pieces, having lugs or collars; but I may make them in one piece, as in Fig. 7. These plates are lugged on both sides, and, as before stated, form the supports for the upper columns, being supported in turn by the lower columns, N N, being lugged to fit both sets of columns and otherwise fastened by bolts or other means of attachment.

$b'\ b'$ are the struts between the upper columns, F F, and a short distance below the upper bed-plates, $i\ i\ i$, and are connected by lugs or bolts or other fastenings to the sleeves $m\ m$, which are fitted and bolted to the columns, as shown in the drawings.

M' M' M' are sleeves having lugs to allow for connection with the various trusses, struts, braces, posts, &c., in the structure. The sleeves are made of metal tubing, and those intended for the upper chords of the spans are made with a chair upon their upper side to hold the sill, which is bolted to the chair, as shown in Figs. 12 and 13.

N N are the lower system of supporting-columns, also made of wrought-iron, steel, or other metal tubing, and are secured to the middle plates, $k\ k$, by lugs and other proper fastening, and the lower system of columns is placed at such an angle to the upper system that a broad base is given similar to the upper ends of the upper set of columns, where they are secured to the plates $i\ i\ i$, this manner of constructing the columns preventing longitudinal thrusts, oscillation, or vibration of the structure when in use.

An additional reason why columns in sets of fours are used is that between the lower set of columns I may construct the stairway for reaching the depot elevation, thus avoiding the occupancy of any part of the sidewalks until the stairway has arrived at a height sufficient to clear the sidewalk.

O O are the lower bed-plates, made of metal, to which, as already stated, are lugged and otherwise fastened the lower columns, N N, and are securely fastened to the foundation-walls, in which they are bedded.

P P are the foundation-walls for the supporting-columns.

R R are trusses made of metal tubing, extending from the lower portion of columns F F to the lower chords of the spans, and are connected to each by sleeves having lugs for that purpose or by other fastenings.

W W and W' W' are the upper and lower lateral struts, made of metal tubing—struts W W extending transversely across and binding the upper chords, and W' W' likewise extending transversely across and binding the lower chords.

Y Y are the side braces, made of the same material as the struts W W, and extend diagonally from the upper to the lower side chords and bind them as described.

Z Z are the metal chairs with the sleeves supporting them, as shown in Figs. 12 and 13. Z' Z' in Fig. 12 are the cushions, made of lead or rubber or other suitable substance to prevent the noise made by a train running over the joints of the rails, and to make traveling more comfortable on the cars by avoiding the usual bumping experienced by all railroad travelers.

$Z^2$ $Z^2$ are the metal plugs or fillings inserted into a hole at each end of every rail to break the vibration caused by the car-wheels when in motion jumping from one rail to the other, and thus practically making the running of the cars noiseless.

The upper system of columns, F F, may be supported by the lower columns directly, connections being made by sleeves properly secured.

Having sufficiently described my invention, what I claim, and desire to secure by Letters Patent, is—

1. A supporting-column for an elevated structure, made in sections, each section consisting of two or more struts and rigid connections for the ends thereof of unequal length, giving to said section the form of a truncated triangle, substantially as set forth and described.

2. A supporting-column for an elevated structure, made in sections, each section consisting of two or more struts united near their ends by unequal rigid connections, said sections being connected to each other by their narrower ends, their wider ends forming the ends of the compound column, substantially as shown and described.

3. A support for an elevated structure, made in sections, each section consisting of four struts united to each other near their ends by unequal rigid connections, giving to said section the form of a truncated pyramid, said sections being superposed one upon another, with their smaller ends in juxtaposition, their larger ends forming the ends of the compound column, substantially as shown and described.

4. An elevated-railroad structure comprising the following mechanism: a track supporting tubular spans braced laterally, vertically, and diagonally, tubular supporting columns having interposed plates between the lower ends of the upper columns and the upper ends of the lower columns, said plates being provided with means of securing the ends of said columns, all substantially as described.

5. An elevated-railroad structure having tracks, tubular spans braced by tubular braces and sleeves, interposed plates between said spans and the upper ends of the columns, said plates having seats for the lower chords, and means of connecting them with the upper ends of said columns, substantially as set forth and described.

6. In an elevated-railway structure, the combination of a track and tubular spans, of supporting-columns made up in sections, the members of the upper section converging to an intermediate plate, the members of the lower section diverging to a base-plate, substantially as set forth and described.

7. In an elevated-railway structure of the character described, the combination of the chords thereof, and a sleeve provided with seats for cross-ties, and also means for securing braces thereto, substantially as set forth and described.

In witness whereof I have hereunto set my hand this 21st day of July, A. D. 1887.

ZACCUR PRALL BOYER.

Witnesses:
FRANK P. KENDRICK,
CHARLES E. HENRY.